United States Patent [19]
Stützel et al.

[11] Patent Number: 4,581,414
[45] Date of Patent: * Apr. 8, 1986

[54] TRANSPARENT, IMPACT-RESISTANT MOLDING COMPOSITIONS BASED ON POLYVINYL CHLORIDE

[75] Inventors: Bernhard Stützel; Friedrich-Wilhelm Küpper; Alfred Oberholz; Alfred Wieland, all of Marl, Fed. Rep. of Germany

[73] Assignee: Huels Aktiengesellschaft, Marl, Fed. Rep. of Germany

[*] Notice: The portion of the term of this patent subsequent to Aug. 20, 2002 has been disclaimed.

[21] Appl. No.: 607,074

[22] Filed: May 4, 1984

[30] Foreign Application Priority Data

May 4, 1983 [DE] Fed. Rep. of Germany ....... 3316224

[51] Int. Cl.$^4$ .................. C08L 27/06; C08L 33/14
[52] U.S. Cl. .................... 525/223; 525/213; 525/292; 525/303; 525/227
[58] Field of Search .................. 525/223, 303, 304

[56] References Cited

U.S. PATENT DOCUMENTS

| | | | |
|---|---|---|---|
| 2,396,434 | 3/1946 | Rehberg et al. | 260/486 |
| 2,458,888 | 1/1949 | Rehberg et al. | 260/83 |
| 3,334,156 | 8/1967 | Calentine et al. | 525/308 |
| 3,448,173 | 6/1969 | Ryan et al. | 525/308 |
| 3,776,982 | 12/1973 | Nicolet et al. | 525/308 |
| 3,840,620 | 10/1974 | Gallagher | 260/899 |
| 4,091,106 | 5/1978 | Walworth | 424/273 P |
| 4,357,435 | 11/1982 | Lewis et al. | 524/239 |

FOREIGN PATENT DOCUMENTS 2013020 9/1971 Fed. Rep. of Germany .
2032938 5/1980 United Kingdom .

OTHER PUBLICATIONS

J. Org. Chem. 14 (1949) pp. 1094–1098.

Primary Examiner—Carman J. Seccuro
Attorney, Agent, or Firm—Millen & White

[57] ABSTRACT

Molding compositions based on polyvinyl chloride contain as the component imparting impact resistance homo- and copolymeric acrylic acid esters of oxethylates of phenol or of substituted phenols, wherein the difference of the indices of refraction $n_D^{20}$ (at least 20° C., measured with the Na D line) between the basic polymer and the component imparting impact resistance at most is ±0.01; optionally copolymers with other acrylic acid esters can also be used in the molding compositions. The latter are inexpensive to manufacture and, besides transparency and weatherability, also have impact resistance.

16 Claims, No Drawings

TRANSPARENT, IMPACT-RESISTANT MOLDING COMPOSITIONS BASED ON POLYVINYL CHLORIDE

BACKGROUND OF THE INVENTION

The present invention relates to impact-resistant, transparent molding compositions based on polyvinyl chloride or on copolymers comprising at least about 80% by weight of vinyl chloride units.

It is known to improve the impact resistance of polyvinyl chloride by polymerizing vinyl chloride in the presence of an elastomer or by blending polyvinyl chloride with elastomer proportions. The resultant products are generally opaque.

Molding compositions of modified polyvinyl chloride having both impact resistance and a certain transparency have, however, also been described in the literature. Thus, DAS No. 2,013,020 describes transparent graft copolymers. In their manufacture, first of all a monomer blend of styrene or α-methylstyrene is graft-polymerized, in the presnce of comonomers having crosslinking effect and in the presence of acrylic and methacrylic acid nitrile or of acrylic and methacrylic acid esters, onto a butyl or 2-ethylhexyl acrylate polymer. Subsequently, polymerization of the vinyl chloride in suspension is carried out in the presence of the thus-produced graft polymer. Apart from the fact that the aforedescribed mode of operation for producing the rubber-elastic phase is expensive due to the plurality of steps and components, the notched impact resistance values demonstrated in the examples are comparatively low.

Transparent, impact-resistant polyvinyl chloride molding compositions have also been disclosed in German Patent No. 2,621,522. These molding compositions consist of three components, namely a vinyl chloride homo- or copolymer, a graft copolymer wherein methyl methacrylate and styrene are grafted on a butadiene rubber, and finally a copolymer of α-methylstyrene, methyl methacrylate, acrylonitrile, and optionally a further, copolymerizable monomer. On the one hand, this involves an expensive multistage process whose sequence of addition of the numerous components is disclosed as extraordinarily critical, even during the preparation of the elastomer proportion; on the other hand, a large number of components is employed; and, finally, the resultant molding compositions are not weatherable on account of the butadiene proportion (cf. DAS No. 2,013,020, column 1, lines 60 et seq.).

This disadvantage of lack of weatherability is eliminated in molding compositions wherein chlorinated polyethylene is added to raise the impact resistance of polyvinyl chloride, as described, for example, in German Pat. No. 2,456,278. Here, there is the drawback of the narrow limits for the chlorine content (38–42%), which can be maintained only with difficulty in performing the process; additionally, only low impact resistance values can be attained. Thus, for example, with the addition of 10% by weight of the special chlorinated polyethylene, impact resistances of only 7–8 kJ/m² are produced.

SUMMARY OF THE INVENTION

Accordingly, it is an object of this invention to eliminate or ameliorate the above-discussed disadvantages of the state of the art, e.g., to provide transparent and weatherable molding compositions having improved impact resistance requiring only a comparatively low expense for their manufacture.

Upon further study of the specification and appended claims, further objects and advantages of this invention will become apparent to those skilled in the art.

It has now been found, surprisingly, that these objects are attained by providing transparent, impact-resistant molding compositions based on polyvinyl chloride or on copolymers containing at least about 80% by weight of vinyl chloride units, containing as the component imparting impact resistance, homo- and/or copolymers of monomers having the following formula

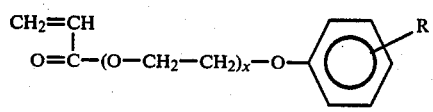

wherein
x is 1–4 and
R is H, CH$_3$, or Cl, wherein the difference of the indices of refraction $n_D^{20}$ (at 20° C., measured with the Na D line) of the basic polymer and that of the component imparting impact resistance is at most ±0.01; and, optionally, including other acrylic acid ester monomers.

DETAILED DESCRIPTION

Suitable amounts of the component imparting impact resistance in the molding compositions are 3–30%, preferably 6–15%, especially 8–12% by weight, based on the total weight of the mixture of polyvinyl chloride and/or vinyl chloride mixed or co-polymer and the component imparting impact resistance.

Preferably, the difference of the indices of refraction $n_D^{20}$ (at 20° C., measured with the Na D line) between that of the basic polymer per se and the component imparting impact resistance per se is especially to be limited to ±0.005, especially to ±0.002, thereby minimizing refractive and scattering effects and maintaining the desired transparency e.g., transmittances of 93–100% or more of the value of that of pure bulk PVC, e.g., at wavelengths in the visible region, e.g., about 600 nm.

In general, all of the homo and copolymers of the foregoing formula will be useful in most, if not all, polyvinyl chloride compositions, i.e., will have the necessary small refractive index difference with the PVC component. In the rare case where a given homo- or copolymer of the foregoing formula does not satisfy the refractive index requirement described above, there will always be another polymer of this formula which will satisfy the requirements for all PVC compositions. When this happens, only routine experimentation will be required to determine the relative refractive indices and only routine experimentation will be required to determine the structure of an alternative homo- or copolymer of the foregoing formula which will satisfy the refractive index difference requirement. For example the refractive index decreases if x of polymers according to the foregoing formula increases and vice versa. The refractive index of polymers according to the foregoing formula increases by changing R from CH$_3$ to H to Cl. Furthermore the refractive index decreases in a given copolymer of the foregoing formula with increasing amount of the aliphatic acrylic ester.

Homo- and copolymeric acrylic acid esters of oxethylates of phenol are preferred as the component imparting impact resistance. Especially preferred are those wherein x is 2 or 3, respectively. The component imparting impact resistance should have an average molecular weight of $M_w = 5 \times 10^4$ to $10^7$, preferably $5 \times 10^4$ to $5 \times 10^6$, and can contain 0-30% by weight, preferably 0-10% by weight, of acrylic ester(s) of aliphatic unbranched alcohols of 4-10 carbon atoms and/or aliphatic branched alcohols of 6-10 carbon atoms as the comonomers incorporated by polymerization. When included in the impact resistance component, these optional comonomers are usually included in an amount of at least 0-30%.

Such added polymers can have the formula

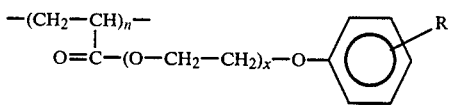

wherein x is 1-3

R is H, CH$_3$, or Cl, and n is a number in the range of 50 to 50,000.

The component imparting impact resistance can also have been produced in the presence of 0.1-2.0% by weight, preferably 0.5-1.0% by weight of crosslinking agents, or they can have been reacted prior to their incorporation into the molding compositions of this invention with crosslinking agents. Examples of suitable conventional crosslinking agents include diallyl phthalate, maleic acid diallyl ester, divinylbenzene, etc.

The polymerization of vinyl chloride to form homo or copolymers can be accomplished in fully conventional manner. Any of the methods of bulk, emulsion, or suspension polymerization can be utilized, as described, for example, on pages 1-59 of the monograph by Kainer, "Polyvinylchlorid und Vinylchlorid-Mischpolymerisate" [Polyvinyl Chloride and Vinyl Chloride Copolymers], Springer Publishers, Berlin/Heidelberg/New York (1965) whose disclosure is incorporated herein. Similarly, the copolymers of vinyl chloride with comonomers are made conventionally. Suitable comonomers include the usual olefinic compounds, e.g., vinyl esters, such as vinyl acetate, vinylidene halogenides, such as vinylidene chloride, acrylic acid and methacrylic acid alkyl esters of 1-18 carbon atoms in the alkyl group, such as the methyl, n-butyl, and lauryl esters, esters of maleic acid, such as diethyl, dipropyl maleate, and monoolefins, such as ethylene or propylene, etc. The comonomers are included up to an extent of 30 wt. % as long as the weight of vinyl chloride units in the total amount of polyvinyl chloride component in the molding composition is maintained at a level of at least 80 wt. %. Mixtures of polyvinyl chlorides can be used, e.g., homo PVC and one or more co-PVC's, or two or more co-PVC's.

By using the polymers imparting impact resistance, made up of acrylic esters of oxethylates of phenol and/or of substituted phenols, the polyvinyl chloride molding compositions of this invention not only have good transparency and considerably improved notched impact resistances, e.g., values of about 13-27 kJ/m$^2$ (DIN 53453; 4 mm) but also are obtained in a simpler way than using prior art methods. The latter require the utilization of polymers built up of several components and produced accordingly only with considerable expense and difficulty.

The monomers used to produce the soft components to be added according to this invention to the polyvinyl chloride composition are, in contrast to the above, obtainable readily and thus economically from oxethylates (accessible by simple ethylene oxide addition to the corresponding phenols), by converting the oxethylates, by direct esterification or by ester interchange with acrylic acid and/or the esters thereof, into the desired monomers of the foregoing formula. Reference is had to the pertinent literature with respect to oxethylation of phenols as well as production of monomeric acrylic esters; typical, in this connection, are, for example, the review articles in M. J. Schick, "Nonionic Surfactant" Vol. I (1967) and in J. K. Haken, "Synthesis of Acrylic Esters by Transesterification" (1967), Noyes Development Co., whose disclosures are incorporated by reference herein.

The acrylate monomers and the polymers obtainable therefrom have been disclosed, in part. Thus, phenoxyethyl acrylate and phenoxyethoxyethyl acrylate have been synthesized before and have been polymerized in various ways (cf. U.S. Pat. Nos. 2,396,434, 2,458,888, as well as J. Org. Chem. 14 [1949] 1094, all of whose disclosures are incorporated by reference herein). The suitability of such polymers for use as the soft component of impact-resistant, transparent PVC molding compositions has not heretofore been recognized. Even in German Pat. No. 2,846,573, describing a process for producing heat-curable synthetic resin compositions as a substitute for polyvinyl chloride plastisols, the range of utilization according to this invention has not been perceived. In the past, the inducement for using 2-phenoxy(polyethoxy)ethyl acrylates was in all cases their low vapor pressure under the processing conditions of the prior art compositions, or the desire of purposely influencing the end use properties (such as, for example, dyeability) by using polar molecular components.

The polymers to be used according to this invention as the component imparting impact resistance can be produced by customary polymerization in bulk, in solution, or in emulsion from the afore-mentioned monomers, analogously as has been disclosed in the monograph "Acrylic Resins" by Horn, Reinhold Publishing Corp. (1960), pages 26-29, or in Houben-Weyl, "Methoden der Organischen Chemie" [Methods of Organic Chemistry], 4th edition (1961), vol. 14, part 1, pp. 1010 et seq., whose disclosures are incorporated by reference herein.

The polymers can be prepared especially advantageously by emulsion polymerization. Suitable emulsifiers are the conventional types. Especially suitable are ionic emulsifiers, e.g., alkyl sulfonates such as sodium stearyl sulfonate, sodium oleyl sulfonate, etc. Furthermore suitable are alkyl sulfates, e.g., sodium lauryl sulfate, sodium stearyl sulfate, and sodium oleyl sulfate, etc., as well as salts of carboxylic acids, such as sodium caprate, sodium laurate, sodium myristate, sodium palmitate, etc. It is also possible to use the above-mentioned classes of compounds with statistical distributions of the aliphatic chain lengths of C$_{12}$-C$_{18}$. Also suitable are arylalkyl sulfonates, for example the sodium salt of p-n-dodecylbenzenesulfonic acid; mixtures of emulsifiers can likewise be employed. The concentration of the emulsifiers is 0.3-3% by weight, preferably 0.5-2.0% by weight, based on the amount of monomer.

Suitable catalysts include the water-soluble compounds usually employed in emulsion polymerization, such as water-soluble azo initiators, e.g., 2,2'-azobis [2-amidinopropane] hydrochloride, or similar compounds disclosed in the literature (see, for example, Nuyken and Kerber, "Makromol. Chem." [Macromolecular Chemistry] 179 : 2845–2857 [1978]); also persulfates, optionally combined with a reducing component such as water-soluble bisulfite, hydrogen peroxide combined with reducing components such as bisulfite, hydrazine, or ascorbic acid; also, combinations of the aforementioned catalysts can be used, optionally in the presence of activating components, such as, for example, copper salts. The usual concentrations are employed. Among the listed initiators, water-soluble azo initiators are preferred. Especially preferred is 2,2'-azobis[2-amidinopropane] dihydrochloride.

Suitable temperatures in the emulsion polymerization are usually 40°–90° C., preferably 50°–70° C. The temperature that is optimum for individual initiators can routinely be determined from the initiator decomposition data known from the literature. The same applies for the phase ratio of monomer/water, which usually should range from 1/10 to 1/1.

In solution polymerization, the following solvents can be utilized, for example: aliphatic saturated carboxylic acid esters, e.g., ethyl acetate, butyl acetate, or similar compounds, aromatic hydrocarbons, e.g., toluene, xylene, etc., ethers, e.g., tetrahydrofuran, diethyl esters, or similar compounds. The amount should be chosen to achieve perfect intermixing and also removal of the heat of polymerization without problems.

Examples of suitable catalysts for solution polymerization include: organic peroxides, e.g., benzoyl peroxide, lauroyl peroxide, or similar compounds; percarbonates, e.g., isopropyl percarbonate, cyclohexyl percarbonate, etc., azo compounds, e.g., azobisisobutyronitrile, etc. Azo initiators are preferred. The polymerization temperature is usually 30° to 110° C.

The copolymers of mixtures of 2-phenoxy (ethoxy) ethyl acrylates as monomers are also prepared in this fashion. Such copolymers can contain very little amounts of each different monomer but the widest latitude in composition is possible. The production of the co-polymers of such monomers with up to 30% by weight of aliphatic acrylic acid esters of 4–10 carbon atoms in the alcohol component likewise proceeds according to the above-described methods. Suitable aliphatic acrylic acid esters of 4–10 carbon atoms in the alcohol portion include: n-butyl acrylate, n-hexyl acrylate, isohexyl acrylate, n-octyl acrylate, 2-ethylhexyl acrylate, n-decyl acrylate, isodecyl acrylate, etc. Preferred are n-butyl acrylate and 2-ethylhexyl acrylate.

The introduction of the component imparting impact resistance into the polyvinyl chloride can take place by all per se conventional methods of modification, e.g., by graft polymerization of vinyl chloride onto the component imparting impact resistance or vice versa, or by any desired kind of blending of polyvinyl chloride with the component imparting impact resistance, for example by mixing in the solid phase on a mixing roll, a Banbury mixer, a plastograph, a compounder-extruder, or the like. If desired, the components can also be premixed by means of a finned-agitator mixer or a powder mixer with rotor. The polyvinyl chloride and the component imparting impact resistance can also be blended in latex form. The latex can then be dried conventionally, for example by passing it through nozzles. Graft polymerization is preferred.

Customary additives, in the usual amounts, e.g., 4–8 wt. %, including stabilizers, plasticizers, mold release agents, pigments, fillers, and the like after being blended with the component imparting impact resistance, can be added to the polyvinyl chloride. These additives can also be mixed in immediately during the blending of the polyvinyl chloride with the component imparting impact resistance or in any other applicable manner. Greater details can be seen from the pertinent technical literature, for example the monograph by Gächter-Müller, "Handbuch der Kunststoff-Additive" [Manual of Plastics Additives], Hanser Publishers, 1979, whose disclosure is incorporated by reference herein.

When evaluating transparency, it must be kept in mind that polyvinyl chloride, as compared with other thermoplastics, must be stabilized in a special way on account of its tendency toward decomposition during the processing operation. Thereby, its transparency is impaired as compared with other thermoplastics. Bulk polyvinyl chloride, being the purest polyvinyl chloride, should exhibit the maximum transparency possible for the composition of this invention. Therefore, if an impact-resistant, i.e., modified, polyvinyl chloride exhibits transparencies closely approaching the transparency of pure bulk polyvinyl chloride, these transparencies will represent the highest possible in this area.

In this connection, consideration must further be given to the fact that transparency, even in the case of bulk polyvinyl chloride, is dependent on the individual formulation, e.g., the addition (absolutely necessary for processing) of mold release agents, stabilizers, and the like, and comparisons may be made only for absolutely identical formulations and, of course, identical layer thicknesses.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The following stabilizing formulation was utilized for the examples set forth below for explanatory purposes:

| | |
|---|---|
| Polyvinyl chloride (or modified polyvinyl chloride) | 100 parts by weight |
| Ba—Cd Stabilizer | 2.5 parts by weight |
| Polyethylene mold release agent | 0.15 part by weight |
| Polymethyl methacrylate processing aid | 1.2 parts by weight |
| Liquid partial fatty acid ester of glycerol | 0.4 part by weight |
| Solid neutral glycerol ester wax | 0.4 part by weight |

In order to produce the test specimens, rolled sheets were first produced at a roll temperature of 185° C. and with a rolling period of 5 minutes. After pressing into plates having a thickness of 2 mm and 4 mm, respectively, the transmission, haze, and notched resistance measurements were conducted as indicated in Table 1.

As borne out by the examples below, the mixtures of this invention show high impact resistance with high transparency. In the following, FD water means fully demineralized water.

(A) PREPARATION OF POLYACRYLIC ACID ESTER

Example 1

The ingredients set out below are charged into a 2-liter steel autoclave with agitator, temperature control, as well as devices for evacuation, feeding of gaseous $N_2$, charging and metered feed of reactants (manufacturer, for example, SFS/Buechi, Uster, Switzerland):
20 parts (250 g) phenoxyethoxyethyl acrylate
76 parts (950 g) FD water
0.24 part (3 g) sodium dodecyl sulfonate
The receiver of the metered feeding device is charged with
0.04 part (0.5 g) of 2,2'-azobis[2-amidinopropane] hydrochloride
4 parts (50 g) of FD water After degasifying and purging with $N_2$, the content of the reactor is heated to 60° C. under 2 bar of excess $N_2$ pressure. During the heating up step, 5 ml of the initiator solution is added; the remainder is uniformly added in metered amounts during the course of 120 minutes after the end of the heating step, and the reaction temperature is maintained at 60° C. After another 30 minutes, the reaction is completed. The reaction mixture is allowed to cool, thus obtaining a white, stable acrylate latex with 19.6% by weight of solid matter, i.e. conversion is about 98% by weight. Gel content in tetrahydrofuran ranges between 50 and 65% by weight.

Example 1a

Example 1 is repeated, additionally charging 0.2 part (2.5 g) of diallyl phthalate into the reactor. Solid content: 19.7% by weight corresponding to about 98% by weight conversion. The gel content in tetrahydrofuran is between 70 and 85% by weight.

Example 2

The following ingredients are charged into the apparatus described in Example 1:
20 parts (250 g) of phenoxyethoxyethyl acrylate
76 parts (950 g) of FD water
0.24 part (3 g) of sodium laurate
The following materials are charged into two receivers of the metering device:
Receiver 1
0.002 part (0.025 g) of ascorbic acid dissolved in 2 parts (25 g) of FD water
Receiver 2
0.002 part (0.025 g) of $H_2O_2$ dissolved in 2 parts (25 g) of FD water After degasifying and purging with $N_2$, the reactor content is heated to 60° C. under 2 bar excess $N_2$ pressure. During heating, respectively 2 ml of the initiator components from receiver 1 and receiver 2 are added, the remainder being added uniformly in metered quantities after the termination of the heating step during the course of 120 minutes, and the reaction temperature is kept at 60° C. After another 30 minutes, the reaction is completed. The reaction mixture is allowed to cool, thus obtaining a white, stable acrylate latex with 19.6% by weight of solids, i.e. conversion is about 98% by weight. Gel content in tetrahydrofuran ranges between 50 and 65% by weight.

Example 2a

Example 2 is repeated, additionally charging 0.2 part (2.5 g) of diallyl phthalate into the reactor. Solid content: 19.8% by weight, corresponding to approximately 98% by weight conversion. The gel content in tetrahydrofuran is between 70 and 85% by weight.

Example 3

Example 1 is repeated, using 20 parts (250 g) of phenoxyethoxyethoxyethyl acrylate instead of phenoxyethoxyethyl acrylate. Conversion and gel content correspond to the date indicated for Example 1.

Example 3a

Example 1 is repeated, employing 20 parts (250 g) of phenoxyethoxyethoxyethyl acrylate instead of phenoxyethoxyethyl acrylate, and additionally charging the reactor with 0.2 part (2.5 g) of diallyl phthalate. Conversion and gel content correspond to the values set forth for Example 1a.

Example 4

Example 1 is repeated, charging, instead of 20 parts of phenoxyethoxyethyl acrylate, 17 parts (212.5 g) of phenoxyethyl acrylate and 3 parts (37.5 g) of butyl acrylate. The metered feeding device is charged with 0.04 part (0.5 g) of potassium persulfate in place of 0.04 part (0.5 g) of 2,2'-azobis[2-amidinopropane] hydrochloride. Conversion and gel content correspond to the data set forth for Example 1.

Example 4a

Example 1 is repeated, charging, instead of 20 parts of phenoxyethoxyethyl acrylate, 17 parts (212.5 g) of phenoxyethyl acrylate and 3 parts (37.5 g) of butyl acrylate, as well as additionally 0.2 part (2.5 g) of diallyl phthalate. The metered feeding device receives 0.04 part (0.5 g) of potassium persulfate in place of 0.04 part (0.5 g) of 2,2'-azobis[2-amidinopropane] hydrochloride. Conversion and gel content correspond to the values indicated for Example 1a.

Example 5

Example 1 is repeated, using, instead of 20 parts of phenoxyethoxyethyl acrylate, a mixture of 18 parts (225 g) of phenoxyethoxyethyl acrylate and 2 parts (25 g) of butyl acrylate. Conversion and gel content correspond to the values set forth for Example 1.

Example 5a

Example 1 is repeated, using, in place of 20 parts of phenoxyethoxyethyl acrylate, a mixture of 18 parts (225 g) of phenoxyethoxyethyl acrylate and 2 parts (25 g) of butyl acrylate, as well as 0.2 part (2.5 g) of diallyl phthalate. Conversion and gel content correspond to the data set forth under Example 1a.

(B) PREPARATION OF THE MIXTURE OF POLYVINYL CHLORIDE AND POLYACRYLIC ACID ESTER

(a) Graft Polymerization of Vinyl Chloride with Polyacrylic Acid Ester

Examples 6 through 15

The following materials are charged into a 2-liter steel autoclave of the type of structure described under (A):

50 parts (200 g) of polyacrylate latex, prepared according to Examples 1, 1a, 2, 2a, 3, 3a, 4, 4a, 5, and 5a (corresponding respectively to about 40 g of solid polymer and 160 g of water)
160 parts (640 g) of FD water
0.03 part (0.12 g) of sorbitan monolaurate
0.08 part (0.32 g) of lauroyl peroxide
0.06 part (0.24 g) of dicetyl peroxodicarbonate After the introduced mixture has been degasified and purged with nitrogen, 90 parts (360 g) of vinyl chloride is forced into the autoclave under agitation at 200-300 rpm and thereafter the agitator speed is raised to 350 rpm. Then
0.4 part (1.6 g) of hydroxyethylcellulose dissolved in
50 parts (200 g) of FD water
is added, and 2 bar of N$_2$ pressure is applied.

The content of the reactor is heated to 60° C., and polymerization is completed at this temperature within about 6 hours up to a pressure drop by 3 bar.

After cooling, residual VC degasification, washing, and drying, pourable powders are obtained, the average grain diameters of which range from 100 to 150 μm.

Values determined for impact resistance and transparency can be derived from Table 1. The previously listed stabilizer formulation was utilized.

Examples 16 through 23

The following materials are charged into a 2-liter steel autoclave of the type of structure described under (A):

37.5 parts (150 g) of polyacrylate latex, prepared according to Examples 1, 1a, 2, 2a, 3, 3a, 5, and 5a (corresponding to respectively about 30 g of solid polymer and 120 g of water)
160 parts (640 g) of FD water
0.03 part (0.12 g) of sorbitan monolaurate
0.08 part (0.32 g) of lauroyl peroxide
0.06 part (0.24 g) of dicetyl peroxodicarbonate After the charged mixture has been degasified and purged with nitrogen, 92.5 parts (370 g) of vinyl chloride is forced into the autoclave under agitation at 200-300 rpm and then the agitator speed is raised to 350 rpm. Then
0.4 part (1.6 g) of hydroxyethylcellulose dissolved in
50 parts (200 g) of FD water
is added, and 2 bar of N$_2$ pressure is applied. The content of the reactor is heated to 60° C., and polymerization is completed at this temperature within about 6 hours up to a pressure drop by 3 bar. After cooling, residual VC degasification, washing, and drying, pourable powders are obtained, the average grain diameters of which range from 100 to 150 μm.

Values determined for impact resistance and transparency can be seen from Table 1. The previously indicated stabilizer formulation was employed.

(b) Mixing of PA and Emlusion Polyvinyl Chloride (E PVC)

Example 24

100 parts (5,000 g) of E PVC latex with 45% PVC (produced, for example according to DOS 2,531,780) and
22.5 parts (1,125 g) of PA latex (with 20% by weight polymer proportion, preparation see Example 1a)
are spray-dried together in a "Nubilosa" laboratory spray-drying installation, thus obtaining a powder which is pourable within limits. Values determined for impact resistance and transparency can be derived from Table 1. The stabilizing formulation was used as indicated above.

TABLE 1

| Modified Polyvinyl Chloride | Transmission, Layer Thickness 2 mm, Wavelength 600 nm | Haze H (Contrast Dimming) Acc. to ASTM D 1003, Layer Thickness 2 mm, Wavelength 600 nm in % | Notched Impact Resistance in kJ/m$^2$, 4 mm Pressed Plates Acc. to DIN 53 453 | Modifying Component in % |
|---|---|---|---|---|
| Bulk polyvinyl chloride acc. to DOS 1,520,595 (standard specimen) | 81 | 8.0 | 2 | 0 |
| DAS 2,013,020 | — | — | 6 | 10 |
| German Patent 2,456,278 | 73 | 24.4 | 5 | 8 |
| According to invention |  |  |  |  |
| Example 6 | 82 | 8.8 | 21 | 10 |
| Example 7 | 82 | 8.6 | 23 | 10 |
| Example 8 | 79 | 9.3 | 20 | 10 |
| Example 9 | 79 | 9.5 | 22 | 10 |
| Example 10 | 78 | 13.6 | 24 | 10 |
| Example 11 | 77 | 14.2 | 27 | 10 |
| Example 12 | 77 | 15.0 | 14 | 10 |
| Example 13 | 78 | 13.7 | 15 | 10 |
| Example 14 | 77 | 11.9 | 23 | 10 |
| Example 15 | 76 | 10.4 | 24 | 10 |
| Example 16 | 84 | 8.0 | 14 | 7.5 |
| Example 17 | 84 | 8.2 | 15 | 7.5 |
| Example 18 | 80 | 8.7 | 13 | 7.5 |
| Example 19 | 81 | 8.9 | 16 | 7.5 |
| Example 20 | 77 | 14.1 | 17 | 7.5 |
| Example 21 | 77 | 15.6 | 17 | 7.5 |
| Example 22 | 78 | 11.3 | 14 | 7.5 |
| Example 23 | 78 | 10.9 | 16 | 7.5 |

TABLE 1-continued

| Modified Polyvinyl Chloride | Transmission, Layer Thickness 2 mm, Wavelength 600 nm | Haze H (Contrast Dimming) Acc. to ASTM D 1003, Layer Thickness 2 mm, Wavelength 600 nm in % | Notched Impact Resistance in kJ/m², 4 mm Pressed Plates Acc. to DIN 53 453 | Modifying Component in % |
|---|---|---|---|---|
| Example 24 | 78 | 16.0 | 22 | 10 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A transparent, impact-resistant molding composition comprising (a) a homopolyvinyl chloride, or a copolymer of vinyl chloride with up to 20 wt. % of an olefinic comonomer, the content of vinyl chloride units in component (a) being at least 80% by weight, and (b) an effective amount of a component imparting impact resistance thereto which is a homo- or copolymer of units of the following formula

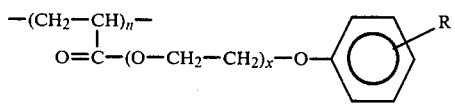

wherein
x is 1–4 and
R is H, CH$_3$, or Cl, or is a copolymer of units of said formula with up to 30 wt. % of an acrylic acid ester of a straight chained C$_{4-10}$-alkanol and/or a branched C$_{6-10}$-alkanol, wherein the difference between the indices of refraction n$_D^{20}$ of the PVC component (a) and the impact-resistance-imparting component (b) is at most ±0.01.

2. A transparent, impact-resistant molding composition of claim 1, wherein the amount of component (b) is 3 to 30% by weight, based on the total weight of the composition.

3. A transparent, impact-resistant molding composition of claim 1 wherein the amount of component (b) is 6 to 15% by weight, based on the total weight of the composition.

4. A transparent, impact-resistant molding composition of claim 1 wherein the amount of component (b) is 8 to 12% by weight, based on the total weight of the composition.

5. A transparent, impact-resistant molding composition of claim 1 wherein component (b) is a homopolymer of said formula.

6. A transparent, impact-resistant molding composition of claim 1 wherein component (b) is a copolymer of monomers of said formula.

7. A transparent, impact-resistant molding composition of claim 1 wherein component (b) contains 0–30% by weight of said acrylic acid ester.

8. A transparent, impact-resistant molding composition of claim 1 wherein said difference in indices of refraction n$_D^{20}$ is at most ±0.005.

9. A transparent, impact-resistant molding composition of claim 1 where said difference in indices of refraction n$_D^{20}$ is at most ±0.002.

10. A transparent, impact-resistant molding composition of claim 1 wherein x is 2 or 3 and R is H.

11. A transparent, impact-resistant molding composition of claim 1 wherein the weight average molecular weight of component (b) is 5×10$^4$ to 1×10$^7$.

12. A transparent, impact-resistant molding composition of claim 1 wherein component (b) further comprises 0.1–2.0% by weight of a compatible crosslinking agent.

13. A transparent, impact-resistant molding composition of claim 1 wherein component (b) is incorporated into the composition by graft polymerization of component (a) thereon.

14. A method of rendering impact resistant a vinyl chloride polymer containing at least 80 wt. % of vinyl chloride units, with minimal loss of transparency, comprising incorporating therein an effective amount of a component imparting impact resistance thereto which is a homo- or copolymer of monomers of the following formula

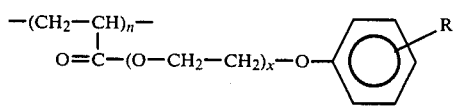

wherein
x is 1–4 and
R is H, CH$_3$, or Cl, or is a copolymer of monomers of said formula with up to 30 wt. % of an acrylic acid ester of a straight chained C$_{4-10}$-alkanol or a terminally branched C$_{6-10}$-alkanol, wherein the difference between the indices of refraction n$_D^{20}$ of the PVC component and the impactresistant-imparting component is at most ±0.01.

15. A method of claim 14 wherein the added homo- or copolymer is of the formula

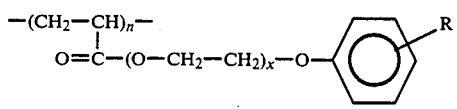

wherein
x is 1–3
R is H, CH$_3$, or Cl, and
n is a number in the range of 50 to 50,000.

16. A method of claim 14 wherein the added homo- or copolymer is of the formula

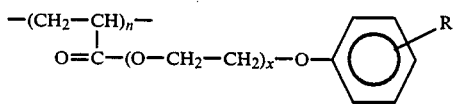

wherein
x is 2 or 3
R is H, CH$_3$, or Cl, and
n is a number in the range of 50 to 50,000.

* * * * *